Patented Feb. 9, 1937

2,069,800

UNITED STATES PATENT OFFICE 2,069,800

CELLULOSIC STRUCTURES

Winfield Walter Heckert, Ardentown, and Miles Augustinus Dahlen, Wilmington, Del., assignors, by mesne assignments, to E. I. du Pont de Nemours & Company, Wilmington, Del., a corporation of Delaware No Drawing. Application May 27, 1933, Serial No. 673,314

32 Claims. (Cl. 106—40)

This invention relates to cellulosic structures, such as filaments, threads, fabrics, sheets, films, caps, tubing or the like, of either the regenerated cellulose or cellulose derivative type. More particularly, this invention relates to cellulosic structures of the type just mentioned having a subdued or low luster and/or which are more or less opaque.

In the ordinary methods of preparing cellulosic structures, such as filaments, threads, films, caps, tubing, etc., from viscose, cuprammonium cellulose, nitrocellulose, cellulose acetate and other cellulosic solutions (without the addition of opaquing and/or low luster-inducing agents to the solutions), the products are transparent or translucent and/or very highly lustrous. For many purposes, transparency, a brilliant sheen and luster are not desirable and thus restrict the uses of the materials. Recently, various methods have been proposed for producing cellulosic structures having a low or subdued luster and/or opacity.

In copending application Serial No. 673,315, filed May 27, 1933, it has been shown that cellulosic structures having a low, reduced or diminished luster can be produced by incorporating in the cellulosic structure an aromatic ether containing in the molecule preferably at least three carbocyclic or heterocyclic nuclei. These ethers are characterized by the fact that they may be produced from either aromatic phenols or aralkyl alcohols, that is, the ethers are formed from a plurality of hydroxy compounds, all of which are aromatic (or heterocyclic) in character.

We have found that cellulosic structures having a low, reduced or diminished luster and/or opacity can be produced by incorporating in the cellulosic structure an ether of an aliphatic or alicyclic, polyhydric alcohol, or an ether of an aliphatic or alicyclic polyhydric ether-alcohol, said ether containing in the molecule preferably at least three carbocyclic or heterocyclic nuclei highly deficient in hydrogen, their —S—, —Se—, —Te— and —NH— analogs, and substitution products, such as, for instance, those in which hydrogen is replaced with halogen, an alkyl group, an alkoxyl group, an hydroxyalkyl group or a carbocyclic or heterocyclic nucleus highly deficient in hydrogen. We may also use as delusterants ether resins such as may be prepared from polyhydroxylated carbocyclic and heterocyclic substances and alkyl or alicyclic polyhalides disclosed in copending application of James A. Arvin, Serial No. 651,634, filed January 13, 1933. The aliphatic portion of the molecule may be substituted with hydroxyl. In so far as this invention is concerned, each closed chain of carbon or hetero atoms or combination of carbon and hetero atoms shall be considered as a nucleus. Thus, benzene, naphthalene and carbazol have one, two and three nuclei respectively.

This invention therefore differs from the aforementioned application in that it embodies ethers formed from aromatic or heterocyclic hydroxy compounds on the one hand, with aliphatic or alicyclic polyhydroxy compounds on the other hand. By aliphatic or alicyclic polyhydroxy compounds, we mean to include compounds such as ethylene glycol, trimethylene glycol, diethylene glycol, ethylidene glycol, glycerin, pentaerythritol, monoethylin, cyclohexanediol, sorbitol, hexamethylene glycol, inositol and quebrachitol.

The objects of the invention will become apparent from the following description and appended claims.

In accordance with the principles of the instant invention, there are provided cellulosic structures having subdued or low lusters and/or being more or less opaque. These desiderata are secured, according to one phase of the invention, by incorporating in the solution from which the structure is to be produced an opaquing and/or low luster-inducing agent of the type hereinafter more fully explained.

The low luster-inducing and/or opaquing agent contemplated by the instant invention is an ether of an aliphatic or alicyclic, polyhydric alcohol, or an ether of an aliphatic or alicyclic, polyhydric ether-alcohol containing in the molecule preferably at least three carbocyclic or heterocyclic nuclei highly deficient in hydrogen, their —S—, —Se—, —Te— and —NH— analogs, and substitution products, such as, for example, those in which hydrogen is replaced with halogen, an alkyl group, an alkoxyl group, an hydroxyalkyl group, or a carbocyclic or heterocyclic nucleus highly deficient in hydrogen. The aliphatic portion of the molecule may be substituted with hydroxyl.

Highly effective delusterants function in particular by reason of their opacifying power which is a function of the difference in refractive index between the delusterant particle and the surrounding medium. Those in our preferred range differ from the index of the medium by at least .10 and the greater this difference, the more effective the compound as an opacifier and/or delusterant. Most organic compounds have several indexes and the statement just made refers to the highest index of the compound or to any one of the several indexes.

These opaquing and/or low luster-inducing agents, which are white in color, possess a sufficiently low vapor pressure and are sufficiently inert to resist change or removal from the cellulosic structure in the ordinary process of making and finishing the same during the manufacture thereof. They also effectively resist removal or change during any of the usual processes to which the finished cellulosic structure may be subjected, such as boiling off, dyeing, bleaching, washing, ironing etc. These substances are incompatible with the mass of the substance constituting the final product. They may be soluble, but in the preferred embodiment of this invention they are insoluble, in the solution from which the structure is prepared.

As illustrative examples of the preferred class of materials which the instant invention contemplates as low luster-inducing and/or opaquing agents may be mentioned di-b-naphthyl ether of ethylene glycol, di-a-naphthyl ether of ethylene glycol, dinaphthyl ether of diethylene glycol, 1,3-di-b-naphthyl ether of glycerin, di-b-naphthyl ether of glycerin chlorohydrin, tri-b-naphthyl ether of glycerin, tribenzyl ether of glycerin, tetrabenzyl ether of pentaerythritol, di-b-naphthyl ether of b-monoethylin, b-naphthyl benzyl ether of ethylene glycol, di-biphenyl ether of glycol, di-(5-chloro-a-naphthyl) ether of ethylene glycol, di-b-naphthyl ether of 1-4 cyclohexanediol, b-naphthoxyethyl b-naphthyl ether of 1-4 cyclohexanediol, b-naphthoxyethyl b-naphthyl ether of glycerin, b-naphthyl thienyl ether of ethylene glycol, 1,2 di-(b-naphthyl mercapto) ethane, b-naphthoxyethyl b-naphthyl sulfide, dibenzthiazyl mercapto ethane, di-b-naphthyl mercaptoethyl sulfide, ethylidene di-b-naphthyl ether, dinaphthyl ether of triethylene glycol, dinaphthyl ether of trimethylene glycol, dinaphthyl ether of tripropylene glycol, ethyl phenyl naphthyl ether of glycerol, tetrabenzyl ether of sorbitol, difurfuryl ether of ethylene glycol, dicarbostyril ether of ethylene glycol, 1-6 dibromo b-naphthyl ether of ethylene glycol.

As examples of an additional classification, aryl ethers of unsaturated polyalcohols, may be mentioned the following: 1:4 dinaphthoxy-butene-2, 1:4 dinaphthoxy-2-methyl-butene-2, 1:4 dinaphthoxy-2-chlor-butene-2.

Though the preferred embodiment of the invention contemplates compounds containing preferably at least three and, for example, four carbocyclic or heterocyclic nuclei, compounds containing less than three carbocyclic or heterocyclic nuclei may also be employed. As illustrative specific examples of this class of compounds may be mentioned difurfuryl ether of ethylene glycol, tetrahydronaphthyl ether of ethylene glycol, diphenyl ether of ethylene glycol, diphenyl ether of glycerin, naphthoxyethanol.

As illustrative examples of ether resins, above referred to, may be mentioned the resins prepared from di-phenylolpropane and dichlorodiethyl ether, diphenylolsulfone and dichlorodiethyl ether, and tetrachlorodiphenylolpropane and dichlorodiethyl ether.

The refractive indexes of a few of the foregoing specific compounds are as follows:

Ethylene glycol di-b-naphthyl ether (3 principal indexes, 1.55, 1.68 and approximately 1.80)
Diethylene glycol di-b-naphthyl ether (3 principal indexes, 1.54, 1.68 and approximately 1.80)
1-3 di-b-naphthyl ether of glycerin (At least 2 principal indexes, approximately 1.62 and 1.67)
Symmetrical dibenzthiazyl mercapto ethane (At least 2 principal indexes, one approximately 1.50 and the other above 1.78)

The quantity of the low luster-inducing and/or opaquing agents which may be used may vary within wide limits, depending principally upon the opaquing and luster desired in the final product. Cellulosic structures containing these low luster-inducing agents in amounts ranging from 0.10% to 20% by weight have given satisfactory results, but, of course, it is obvious that smaller or larger quantities may be employed as desired. When a viscose solution is employed, satisfactory results may be secured if it contains 7% cellulose and from 0.01% to 1.5% more or less of the low luster-inducing and/or opaquing agent.

If desired, the low luster-inducing and/or opaquing agents contemplated by the instant invention may be used in combination with other low luster-inducing agents, such as mineral oil, petroleum jelly, waxes, paraffin, benzene, toluene, pine oil, or inorganic pigments, such as titanium dioxide, lithopone, zinc sulfide, etc.

The low luster-inducing and/or opaquing agent may be added to the solution at any stage in the course of manufacture thereof or after the preparation of the solution and prior to the spinning, extrusion or casting operation. It may be added directly, if the particle size is satisfactory, or after suitable adjustment of the particle size by any of the well known methods, such as emulsification, grinding in a colloid mill or pebble mill, or in the form of a suspension or emulsion prepared with or without the assistance of suitable dispersing agents or protective colloids, such as soaps, sulphonated oils, alkyl naphthalene sulphonates, sodium caseinate, etc. or combinations thereof.

In order to more fully explain the principles of this invention, the following illustrative examples are given. It is to be understood that these examples do not in any way restrict the invention thereto but merely illustrate several specific and preferred embodiments which have given satisfactory results.

*Example I.*—20 pounds of ethylene glycol di-b-naphthyl ether are ground in a colloid mill with 40 pounds of water and 0.4 pound of sodium caseinate until most of the particles are below 1 micron in diameter. A sufficient quantity of the suspension is thoroughly incorporated and distributed throughout the viscose during the mixing operation to yield a final viscose solution containing 7% cellulose, 6% NaOH and 0.5% ethylene glycol di-b-naphthyl ether. The viscose is then ripened and finally spun or cast in the usual way.

The resulting product has a permanent and desirable dull luster which is much lower than could be produced by an equivalent weight of mineral oil.

*Example II.*—A slurry of ethylene glycol di-b-naphthyl ether prepared as described in the preceding example is filtered. After filtration, 10 pounds of ether (dry basis) are dispersed in 30 pounds of 3% cellulose acetate in acetone alcohol solution by grinding in a pebble mill. A sufficient quantity of this suspension is incorporated and distributed in a cellulose acetate solution to form a spinning solution containing 25% cellulose acetate and 1% ethylene glycol di-b-naphthyl ether. The solution is then spun and processed in the usual way, as, for example, by the dry spinning process.

*Example III.*—An emulsion of diethylene glycol di-b-naphthyl ether is prepared with an average particle size of from 0.5 to 1 micron in diameter by any suitable method, such as emulsifying a benzene or similar solution thereof in water, using a suitable protective colloid. If desired, this material may be ground to the desired particle size as described in Example I. The emulsion or suspension is added and incorporated in viscose using such amounts as to produce a solution containing 0.5% diethylene glycol di-b-naphthyl ether, 7% cellulose and 6% NaOH. The resulting viscose is processed and finally spun in the usual way.

Example IV.—A sample of 1-6-dibromo-b-naphthyl ether of ethylene glycol is ground to a particle size of about 0.5 micron in the manner described in Example I. A sufficient quantity of this suspension is added to and incorporated in a viscose solution to yield a final solution containing 0.3% of the ether, 7% cellulose and 6% NaOH. The viscose is then processed and finally spun in the usual manner.

Example V.—1.5 pounds of a resin, prepared from diphenylolsulfone and dichlorodiethyl ether in the manner disclosed in a copending application of James A. Arvin, Serial No. 651,634, filed January 13, 1933, are dissolved in 100 pounds of a 15% solution of cellulose acetate in acetone and alcohol. This solution is dry spun in the usual manner and yields a yarn with a desirable low luster.

Though the preferred embodiments of this invention contemplate the incorporation of the low luster-inducing agent in the solution at some time prior to the extrusion or casting thereof, satisfactory results may be secured also by applying the low luster-inducing agent to a previously formed cellulosic structure. In other words, the low luster-inducing agent may be incorporated in the final cellulosic structure by an after treatment.

Though the invention has been specifically described in connection with the viscose and cellulose acetate processes, it is obvious that the principles thereof are equally applicable to the cuprammonium and cellulose nitrate processes.

In the case of cellulosic solutions employing organic solvents, it is only necessary that a suitable choice of ether be made so that its solubility characteristics do not interfere. It has already been pointed out that the low luster-inducing substance must be incompatible with the mass of substance constituting the final product. In addition, in the case of cellulose acetate or nitrate spinning solutions, it is preferable that the low luster-inducing substance be insoluble in the solvent employed. However, resinous materials and certain crystalline substances soluble in the solvent precipitate (on the evaporation of the solvent) in the cellulose acetate in the form of fine amorphous or crystalline particles sufficiently small and well distributed to avoid harmful effect on the physical properties of the resulting structure. The advantage in such cases lies in avoiding the necessity for emulsifying or grinding the compounds to obtain suitable subdivisions. Suitable compounds may be readily selected from any specific system by one skilled in the art.

Since it is obvious that various changes and modifications may be made in the above description without departing from the nature or spirit thereof, this invention is not restricted thereto except as set forth in the appended claims.

We claim:

1. An artificial cellulosic structure having a low luster and/or opacity imparted thereto by the incorporation therein of an incompatible organic compound of the class which consists of ethers of aliphatic or alicyclic, polyhydric alcohols or ethers of aliphatic or alicyclic, polyhydric ether-alcohol, containing in the molecule at least three carbocyclic or heterocyclic nuclei highly deficient in hydrogen, ether resins derived from polyhydric phenols and polyhydric aliphatic or alicyclic alcohols or ether alcohols, the —S—, —Se—, —Te— and —NH— analogs of said ethers and substitution products of said ethers and analogs in which hydrogen is replaced with halogen, an alkyl group, an alkoxyl, an hydroxyalkyl group or a carbocyclic or heterocyclic nucleus highly deficient in hydrogen.

2. An artificial cellulosic structure having a low luster and/or opacity imparted thereto by the incorporation therein of an incompatible ether of a glycol containing in the molecule at least three carbocyclic or heterocyclic nuclei highly deficient in hydrogen.

3. An artificial cellulosic structure having a low luster and/or opacity imparted thereto by the incorporation therein of an incompatible ether of ethylene glycol containing in the molecule at least three carbocyclic or heterocyclic nuclei highly deficient in hydrogen.

4. An artificial cellulosic structure having a low luster and/or opacity imparted thereto by the incorporation therein of an incompatible ether of a substituted ethylene glycol containing in the molecule at least three carbocyclic or heterocyclic nuclei highly deficient in hydrogen and in which the substituent group or groups replaces hydrogen.

5. An artificial cellulosic structure having a low luster and/or opacity imparted thereto by the incorporation therein of an incompatible naphthyl ether of ethylene glycol.

6. An artificial cellulosic structure having a low luster and/or opacity imparted thereto by the incorporation therein of an incompatible dinaphthyl ether of ethylene glycol.

7. An artificial cellulosic structure having a low luster and/or opacity imparted thereto by the incorporation therein of an incompatible dinaphthyl ether of diethylene glycol.

8. An artificial cellulosic structure having a low luster and/or opacity imparted thereto by the incorporation therein of an incompatible di-b-naphthyl ether of ethylene glycol.

9. An artificial cellulosic structure having a low luster and/or opacity imparted thereto by the incorporation therein of an incompatible substituted naphthyl ether of ethylene glycol in which the substituent group or groups replaces hydrogen.

10. An artificial cellulosic structure having a low luster and/or opacity imparted thereto by the incorporation therein of an incompatible substituted dinaphthyl ether of ethylene glycol in which the substituent group or groups replaces hydrogen.

11. An artificial cellulosic structure having a low luster and/or opacity imparted thereto by the incorporation therein of an incompatible substituted dinaphthyl ether of diethylene glycol in which the substituent group or groups replaces hydrogen.

12. An artificial cellulosic structure having a low luster and/or opacity imparted thereto by the incorporation therein of an incompatible substituted di-b-naphthyl ether of ethylene glycol in which the substituent group or groups replaces hydrogen.

13. An artificial cellulosic structure having a low luster and/or opacity imparted thereto by the incorporation therein of an incompatible naphthyl ether of glycerin.

14. An artificial cellulosic structure having a low luster and/or opacity imparted thereto by 1-3 di-b-naphthyl ether of glycerin.

15. An artificial cellulosic structure having a low luster and/or opacity imparted thereto by the incorporation therein of an incompatible ether of a glycol containing at least one condensed nucleus and containing in the molecule at least three carbocyclic or heterocyclic nuclei highly deficient in hydrogen.

16. An artificial cellulosic structure having a low luster and/or opacity imparted thereto by the incorporation therein of an incompatible ether of ethylene glycol containing at least one condensed nucleus and containing in the molecule at least three carbocyclic or heterocyclic nuclei highly deficient in hydrogen.

17. Artificial silk filaments formed of regenerated cellulose having a low luster and/or opacity imparted thereto by the incorporation therein of an incompatible organic compound of the class which consists of ethers of aliphatic or alicyclic, polyhydric alcohols or ethers of aliphatic or alicyclic, polyhydric ether-alcohol containing in the molecule at least three carbocyclic or heterocyclic nuclei highly deficient in hydrogen, ether resins derived from polyhydric phenols and polyhydric aliphatic or alicyclic alcohols or ether alcohols, the —S—, —Se—, —Te— and —NH— analogs of said ethers and substitution products of said ethers and analogs in which hydrogen is replaced with halogen, an alkyl group, an alkoxyl, an hydroxyalkyl group or a carbocyclic or heterocyclic nucleus highly deficient in hydrogen.

18. Artificial silk filaments formed of regenerated cellulose having a low luster and/or opacity imparted thereto by the incorporation therein of an incompatible ether of a glycol containing in the molecule at least three carbocyclic or heterocyclic nuclei highly deficient in hydrogen.

19. Artificial silk filaments formed of regenerated cellulose having a low luster and/or opacity imparted thereto by the incorporation therein of an incompatible ether of ethylene glycol containing in the molecule at least three carbocyclic or heterocyclic nuclei highly deficient in hydrogen.

20. Artificial silk filaments formed of regenerated cellulose having a low luster and/or opacity imparted thereto by the incorporation therein of an incompatible ether of a substituted ethylene glycol containing in the molecule at least three carbocyclic or heterocyclic nuclei highly deficient in hydrogen.

21. Artificial silk filaments formed of regenerated cellulose having a low luster and/or opacity imparted thereto by the incorporation therein of an incompatible naphthyl ether of ethylene glycol.

22. Artificial silk filaments formed of regenerated cellulose having a low luster and/or opacity imparted thereto by the incorporation therein of an incompatible dinaphthyl ether of ethylene glycol.

23. Artificial silk filaments formed of regenerated cellulose having a low luster and/or opacity imparted thereto by the incorporation therein of an incompatible dinaphthyl ether of diethylene glycol.

24. Artificial silk filaments formed of regenerated cellulose having a low luster and/or opacity imparted thereto by the incorporation therein of an incompatible di-b-naphthyl ether of ethylene glycol.

25. Artificial silk filaments formed of regenerated cellulose having a low luster and/or opacity imparted thereto by the incorporation therein of an incompatible substituted naphthyl ether of ethylene glycol in which the substituent group or groups replaces hydrogen.

26. Artificial silk filaments formed of regenerated cellulose having a low luster and/or opacity imparted thereto by the incorporation therein of an incompatible substituted dinaphthyl ether of ethylene glycol in which the substituent group or groups replaces hydrogen.

27. Artificial silk filaments formed of regenerated cellulose having a low luster and/or opacity imparted thereto by the incorporation therein of an incompatible substituted dinaphthyl ether of diethylene glycol in which the substituent group or groups replaces hydrogen.

28. Artificial silk filaments formed of regenerated cellulose having a low luster and/or opacity imparted thereto by the incorporation therein of an incompatible substituted di-b-naphthyl ether of ethylene glycol in which the substituent group or groups replaces hydrogen.

29. Artificial silk filaments formed of regenerated cellulose having a low luster and/or opacity imparted thereto by the incorporation therein of an incompatible naphthyl ether of glycerin.

30. Artificial silk filaments formed of regenerated cellulose having a low luster and/or opacity imparted thereto by the incorporation therein of 1-3 di-b-naphthyl ether of glycerin.

31. Artificial silk filaments formed of regenerated cellulose having a low luster and/or opacity imparted thereto by the incorporation therein of an incompatible ether of a glycol and containing at least one condensed nucleus containing in the molecule at least three carbocyclic or heterocyclic nuclei highly deficient in hydrogen.

32. Artificial silk filaments formed of regenerated cellulose having a low luster and/or opacity imparted thereto by the incorporation therein of an incompatible ether of ethylene glycol and containing at least one condensed nucleus and containing in the molecule at least three carbocyclic or heterocyclic nuclei highly deficient in hydrogen.

WINFIELD WALTER HECKERT.
MILES AUGUSTINUS DAHLEN.